United States Patent [19]

Holdsworth et al.

[11] Patent Number: 5,284,423

[45] Date of Patent: Feb. 8, 1994

[54] COMPUTER CONTROLLED POSITIVE DISPLACEMENT PUMP FOR PHYSIOLOGICAL FLOW SIMULATION

[75] Inventors: David Holdsworth; Daniel W. Rickey; Maria Drangova; John Miller; Aaron Fenster, all of London, Canada

[73] Assignee: University Hospital (London) Development Corporation, Ontario, Canada

[21] Appl. No.: 940,897

[22] PCT Filed: Feb. 26, 1992

[86] PCT No.: PCT/CA92/00081

§ 371 Date: Oct. 27, 1992

§ 102(e) Date: Oct. 27, 1992

[87] PCT Pub. No.: WO92/15979

PCT Pub. Date: Sep. 17, 1992

[30] Foreign Application Priority Data

Feb. 27, 1991 [GB] United Kingdom ............... 9104097

[51] Int. Cl.⁵ ............................................. F04B 49/00
[52] U.S. Cl. ....................................... 417/28; 417/45; 417/415
[58] Field of Search ................... 417/28, 22, 20, 23, 417/45, 415, 418

[56] References Cited

U.S. PATENT DOCUMENTS

| | | | |
|---|---|---|---|
| 3,612,729 | 10/1971 | Commarmot | 417/415 |
| 3,966,358 | 6/1976 | Heimes et al. | 417/45 |
| 4,150,925 | 4/1979 | Perkins | 417/418 |

FOREIGN PATENT DOCUMENTS

2380585 9/1978 France.
2458288 1/1981 France.

OTHER PUBLICATIONS

D. W. Holdsworth et al.; "Computer-Controlled Positive Displacement Pump for Physiological Flow Simulation"; *Medical & Biological Engineering & Computing*, Nov. 1991; pp. 565-570.

Eloy Schulz et al; "A Precision Pump for Simulated Cardiographic Studies"; *The Journal of Nuclear Medicine*; vol. 22 Jul. 1981; No. 7; pp. 643-634.

H. F. Routh et al; "Role of Models in Understanding and Interpreting Clinical Doppler Ultrasound"; *Medical Progress Through Technology*, 15 (1989) Nos. 3/4; pp. 155-169.

J. Tirinato et al; "Performance Effect and Modeling"; *Proceedings of the Thirteenth Annual Northeast Bioengineering Conference*; pp. 339-342.

David N. Ku et al; "Laser Doppler Anemometer Measurements of Pulsatile Flow in a Model Carotid Bifurcation"; *J. Biomechanics*; vol. 20 No. 4 pp. 407-421.

M. M. Werneck et al; "Flexible Hydraulic Simulator for Cardiovascular Studies"; *Medical & Biological Engineering & Computing*; Jan. 1984; 22, pp. 86-89.

Bruce Ian Tranmer et al; "Pulsatile Versus Nonoulsatile Blood Flow in the Treatment of Acute Cerebral Ischemia", Neurosurgery; vol. 19, 1986; pp. 724-731.

Kenneth J. W. Taylor; "Clinical Applications of Carotid Doppler Ultrasound"; pp. 120-161.

(List continued on next page.)

*Primary Examiner*—Richard A. Bertsch
*Assistant Examiner*—David W. Scheuermann

[57] ABSTRACT

A positive displacement pump includes a reservoir for storing fluid, a cylinder for receiving and discharging the fluid and a piston within the cylinder for forcing the fluid into and out of the cylinder. The pump further includes a four-way valve having an inlet port connected to a reservoir, a pair of bidirectional ports connected to the opposite ends of the cylinder and an outlet port. Mechanisms are provided for receiving a user flow waveform expressed in terms of predetermined flow rate as a function of time and in response moving the piston and configuring the four-way valve to provide fluid flow from the reservoir through the valve and into one of the opposite ends of the cylinder, and from the other one of the opposite ends of the cylinder through the valve to the outlet port in accordance with the user flow waveform.

19 Claims, 11 Drawing Sheets

OTHER PUBLICATIONS

Adam P. Shortland et al; "Doppler Spectral Waveform Generation in Vitro: An Aid to Diagnosis of Vascular Disease"; *Ultrasound in Med & Biol.*, vol. 15, No. 8, pp. 737-748 1989.

K. Poots et al; "A new Pulsatile Flow Visualization Method Using A Photochromic Dye With Application to Doppler Ultrasound"; pp. 203-218.

C. Marquis, MD et al; "Quantitative Pulsed Doppler Measurement of Common Femoral Artery Blood Flow Variables During Postocclusive Reactive Hyperemia"; *J. Clin. Ultrasound;* 14:165-170, Mar./Apr. 1986.

Y. F. Law et al; "Computer-Controlled Pulsatile Pump System For Physiological Flow Simulation"; *Med & Biol. Eng. & Comput.;* 1987, 25, pp. 590-595.

W. N. McDicken; "A Versatile Test-Object for the Calibration of Ultrasonic Doppler Flow Instruments"; *Ultrasound in Med. & Biol.;* vol. 12, No. 3, pp. 245-249, 1986.

J. N. Petersen; "Digitally Controlled System For Reproducing Blod Flow Waveforms In Vitro"; *Med & Biol. Eng. & Comput;* 1984, 22, 277-280.

COMPUTER CONTROLLED POSITIVE DISPLACEMENT PUMP FOR PHYSIOLOGICAL FLOW SIMULATION

FIELD OF THE INVENTION

This invention relates in general to flow simulation devices and more particularly to a computer-controlled positive displacement pump for producing simulated physiological flow waveforms.

BACKGROUND OF THE INVENTION

The ability to reproduce realistic arterial flow waveforms in vitro is essential in the study of vascular haemodynamics. Simulated pulsatile flow has been used extensively in previous investigation of flow in arterial models with bifurcations and stenoses. Many different techniques have been used to measure flow in these models, including (1) laser Doppler anemometry (Ku, D. N, and Giddens, D. P. (1987): *Laser Doppler Anemometer Measurements of Pulsatile Flow in a Model Carotid Bifurcation* J. Biomechanics, 20, 407-421), (2) Doppler ultrasound (Cho, Y. I., Back, L. H., Crawford, D. W., Cuffel, R. F. (1983): *Experimental Study of Pulsatile and Steady Flow Through a Smooth Tube and an Atherslerotic Coronary Artery Casting of Man*, J. Biomechanics, 16, 933-946.); and (Fei D. Y., Billian, C., Rittgers, S. E. (1988): *Flow Dynamics in a Stenosed Carotid Bifurcation Model-Part 1: Basic Velocity Measurements*, Ultrasound in Med. & Biol., 14, 21-31), (3) magnetic resonance (Evans, A. J., Hedlund, L. W., Herfkens, R. J., Utz, J. A., Fram, E. K., (1987): *Evaluation of Steady and Pulsatile Flow with Dynamic MRI Using Limited Flip Angles and Gradient Refocused Echoes*, Magnetic Resonance Imaging, 5, 475-482); and (4) digital radiography (Cunningham, I. A., Yamada, S., Hobbs, B. B., Fenster A., (1989): *Arterial Flow Characterization with a Photodiode Array Based Imaging System*. Med. Phys., 16, 179-187).

Physiological pulsatile flow waveforms are also required to investigate the role of pulsatility in tissue perfusion (Tranmer, B. I., Gross, C. E., Kindt, G. W., Adey, G. R., (1986): *Pulsatile Versus Nonpulatile Cardiovascular Studies*, Med. & Biol. Eng. & Comput., 22, 86-89).

Finally, the ability to mimic arterial flow is essential for quality assurance and calibration of all clinical techniques of blood flow measurement, such as Doppler ultrasound (McDicken, W. N. (1986): *A Versatile Test-object for the Calibration of Ultrasonic Doppler Flow Instruments*, Ultrasound in Med. & Biol., 26, 245-249); and Shortland, A. P., Cochrane, T., (1989): *Doppler Spectral Waveform Generation in vitro: An Aid to Diagnosis of Vascular Disease*, Ultrasound in Med. & Biol., 15, 737-748).

Most of the prior art techniques for the investigation of time-varying flow require gated acquisition of many cardiac cycles, so cycle-to-cycle variability in the flow waveform must be small. Longterm stability is equally important for quality assurance applications where the flow source may be used for absolute calibration of clinical instruments. Therefore, a blood flow simulator must be capable of producing a wide range of flow rates in order to simulate flow in the peripheral vasculature, where peak flow rates of 30 ml s$^{-1}$ have been reported (Marquis, C., Meister, J.-J., Mooser, E., and Misoman, R., (1986): *Quantitative Pulsed Doppler Measurement of Common Femoral Artery Blood Flow Variable during Postocclusive Reactive Hyperemia*, J. Clin. Ultrasound, 14, 165-170). It must be easily programmed to produce a variety of pulsatile waveforms, including waveforms with flow reversal. The simulator must be capable of producing continuous steady flow, which is required as the basis for many experimental investigations and calibration procedures. It is essential that a pumping mechanism not produce gas bubbles or cavitation, since bubbles change the hydrodynamic properties of the fluid, and their presence will produce measurement artifacts, particularly with ultrasound instrumentation. Finally, a device to stimulate physiological flow should operate as an ideal flow source, capable of generating sufficient pressure to be unaffected by changes in the peripheral resistance of the model vascular system under investigation.

Many different pumps have been proposed to meet these requirements, and Law, Y. F., Cobbold, R. S. C., Johnson, K. W., Bascom, P. A. J., (1987): *Computer-controlled Pulsatile Pump System for Physiological Flow Simulation*. Med. & Biol. Eng. & Comput., 25, 590-595 provides a thorough review of previous work. Briefly, prior art devices can be categorised according to their basic pump type; gear, peristaltic or piston.

Gear pumps have been used (Issartier, P., Sioffi, M., Pelissier, R., (1978): *Simulation of Blood Flow by a Hydrodynamic Generator*, Med. Prog. Technol., 6, 39-40) to generate pulsatile waveforms. However, the drawbacks of this approach include damage to suspended particles and sensitivity to cavitation due to the action of the gears.

Modified peristaltic pumps have been used (Douville, Y. Johnston, K. W., Kassam, M., Zuech, P., Cobbold, R. S. C., Jares, A., (1983): *An in vitro Model and its Application for the Study of Carotid Doppler Spectral Broadening*, Ultrasound in Med. & Biol., 14, 21-31; Law, Y. F., Cobbold, R. S. C., Johnson, K. W., Bascom, P. A. J., (1987): *Computer-Controlled Pulsatile Pump System for Physiological Flow Simulation*, Med. & Biol. Eng. & Comput., 25, 590-595) to simulate physiological flow waveforms by mechanical manipulation of the backplate or computer-control of the roller. This approach allows the production of only a limited subset of waveforms and is not well suited to the production of steady flow. It is also difficult to program new waveforms, or produce reverse flow with this technique.

Cam-driven piston pumps have been used (Kiyose T. A., Kusaba, M., Inokuchi, Y., Takamatsu, U., (1977): *Development of a Pump System for Experimental Model Simulation of Blood Flow in Peripheral Artery*, Fucuota Acta Med., 68, 86-91; Appugliese R., Jares, A., Kassam, M., Johnston K. W., Cobbold, R. S. C., Hummel, R. L., Arato, P. (1980): *Pulsatile Visualization for in-vitro Haemodynamic Studies Related to Doppler Ultrasound*, Dig. 8th Can. Biol. Eng.. conf., 3-4; and Poots, K., Cobbold, R. S. C., Johnston, K. W., Appugliese, R., Kassam, M., Zuech, P. E., Hummel, R. L., (1986): *A New Pulsatile Flow Visualization Method Using a Photochromic Dye Application to Doppler Ultrasound*, Ann. Biodmed. Eng., 14, 203-218) to simulate peripheral arterial flow. This class of pumps share the general disadvantages of difficulty in programming new waveforms and difficulty in producing steady flow.

All of the flow simulators described above have one other significant disadvantage, namely that some form of flow monitoring must be performed to provide feedback and to determine the output waveform.

A variation of flow simulator reported by Werneck, N. M., Jones, N. B., Morgon, J., (1984): *Flexible Hydraulic Simulator for Cardiovascular Studies*, Med & Biol. Eng. & Comput., 22, 86-89, makes use of a servo-motor driven piston pump which acts as an ideal flow source. This approach overcomes many of the limitations of previous designs, but is not well suited to the production of uninterrupted constant flow.

SUMMARY OF THE INVENTION

According to the present invention, a computer controlled positive displacement pump is provided for producing physiological blood flow waveforms, including reverse flow, as well steady flow for indefinite periods of time.

More particularly, the pump of the present invention comprises a cylinder having bi-directional flow ports at opposite ends connected to two ports of a four-way valve, the remaining two ports of the valve being connected to a reservoir for restoring fluid and an outlet, respectively. A computer controlled stepper motor operates a piston within the cylinder for precisely controlling fluid flow into and out of the cylinder. A computer is provided for receiving a user input fluid flow waveform and in response controlling operation of the stepper motor and the four-way valve to generate simulated physiological flow waveforms. At the end of each stroke of the piston within the cylinder, the valve may be reconfigured to reverse the fluid flow directions into and out of the ports at the opposite ends of the cylinder, thereby facilitating steady fluid flow as well repetitive continuous cycles of the user input fluid flow waveform.

BRIEF DESCRIPTION OF THE DRAWINGS

A detailed description of the preferred embodiment is described herein below with reference to the following drawings, in which:

FIG. 8a shows the measured blood flow waveform from the human carotid artery, and FIG. 8b shows a simulated carotid blood flow waveform produced by the pump according to the present invention.

DETAILED DESCRIPTION OF THE PREFERRED EMBODIMENT

Figure 1:
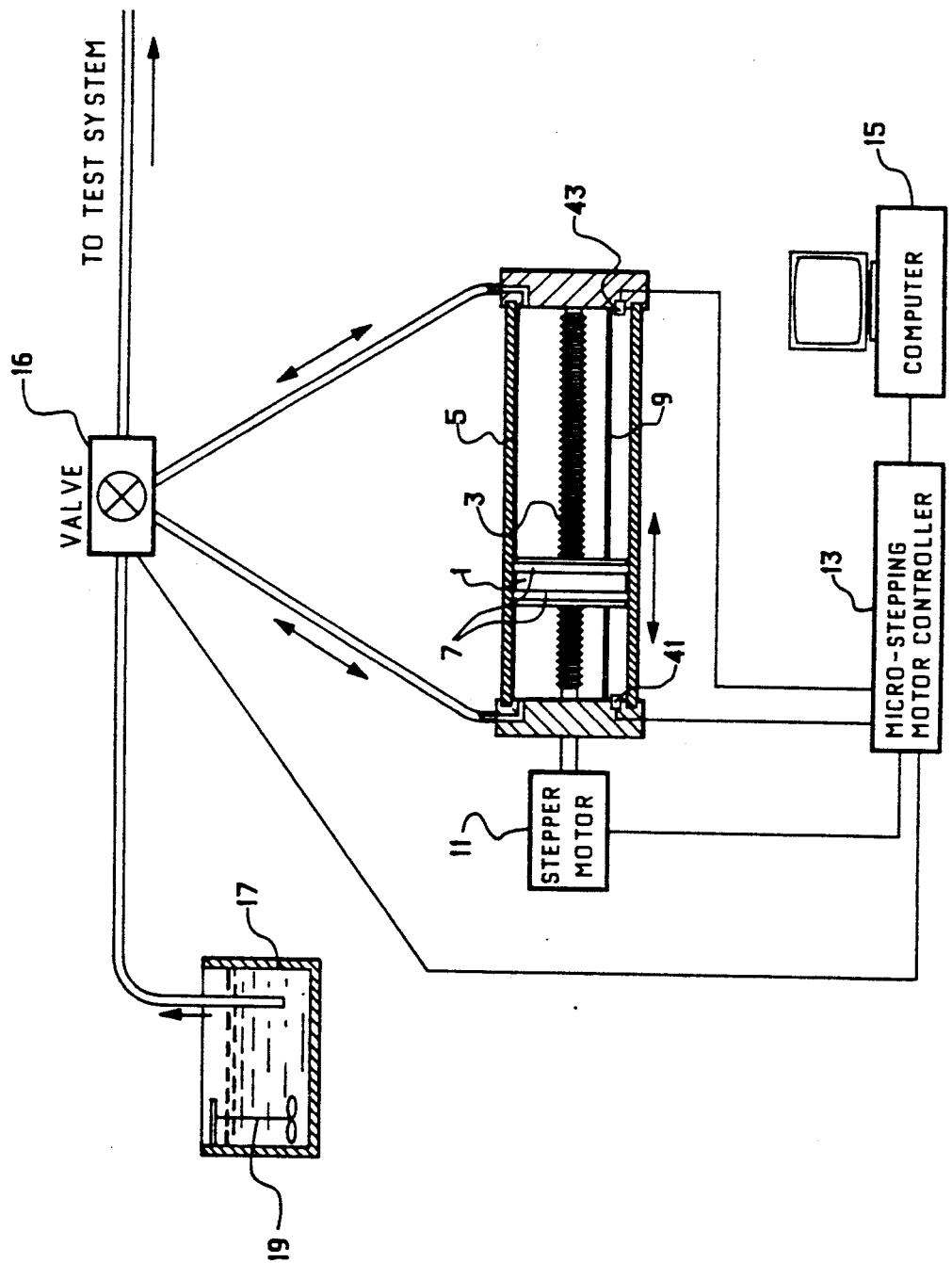
FIG. 1 is a schematic diagram of the positive displacement pump according to the present invention.

The computer controlled positive displacement pump of the preferred embodiment is illustrated schematically in FIG. 1. The pump comprises a piston 1 (preferably 6 cm in diameter), driven on a lead screw 3 within an acrylic tube cylinder 5. The piston 1 is sealed against the cylinder 5 with two O-rings 7, and is prevented from turning within the cylinder by a small, off-axis shaft 9 which passes through an off-axis aperture in the piston. The lead screw 3 is rotated by means of a computer-controlled stepper motor 11 (Compumotor Corporation, Cupertino, Calif). The motor 11 produces 0.5 N-m torque at rotational speeds of up to eight revolutions per second. A micro-stepping motor controller 13 provides control signals for the motor 11 wherein each shaft rotation of the motor 11 is divided into 25,000 discrete microsteps. The pitch of the lead screw 3 is selected so that one microstep results in the displacement of 0.198 $\mu$l from the pump cylinder 5.

According to the preferred enmbodiment, the cylinder 5 is characterized by a usable stroke volume of 450 ml, although larger or smaller volumes are possible with minimal design changes. The micro-stepping motor controller 13 operates in conjunction with a host computer 15 for controlling operation of the stapper motor 11. Specifically, a user input fluid flow waveform is entered into host computer 15. Within the host computer 15, the flow rate as a function of time is first digitized and interpolated to a known temporal interval. The motor controller 13 then produces a shaft rotation of stepper motor 11 which ejects the appropriate volume of fluid in each time interval. According to the preferred embodiment, the controller architecture allows this interval to be chosen between 2 and 50 milliseconds. Once loaded with the waveform data, the motor controller 13 repeats the complete waveform a preset number of times without instructions from the host computer 15. The valid waveforms are limited only by the available torque of the stepper motor 11 and the usable volume of the cylinder 5.

A four-way spool valve 16 (Mark 7, Numatics, Highland, Mo.) is used to interchange the outlet and inlet paths to opposite ends of the cylinder 5 when the piston 1 reaches the end of its stroke travel within the cylinder, thereby allowing the pump to re-fill the portion of the cylinder 5 on one side of piston 1 while forcing fluid from the cylinder on the other side of the piston 1 for providing nearly 100% duty cycle. An active control valve is preferred, rather than passive check valves, so that reverse flow can be easily produced.

Fluid is provided to the cylinder 5 via valve 16 from a reservoir 17. The reservoir 17 incorporates a magnetic stirrer 19 (schematically shown in FIG. 1) to ensure consistent mixing of the fluid.

Figure 2A:
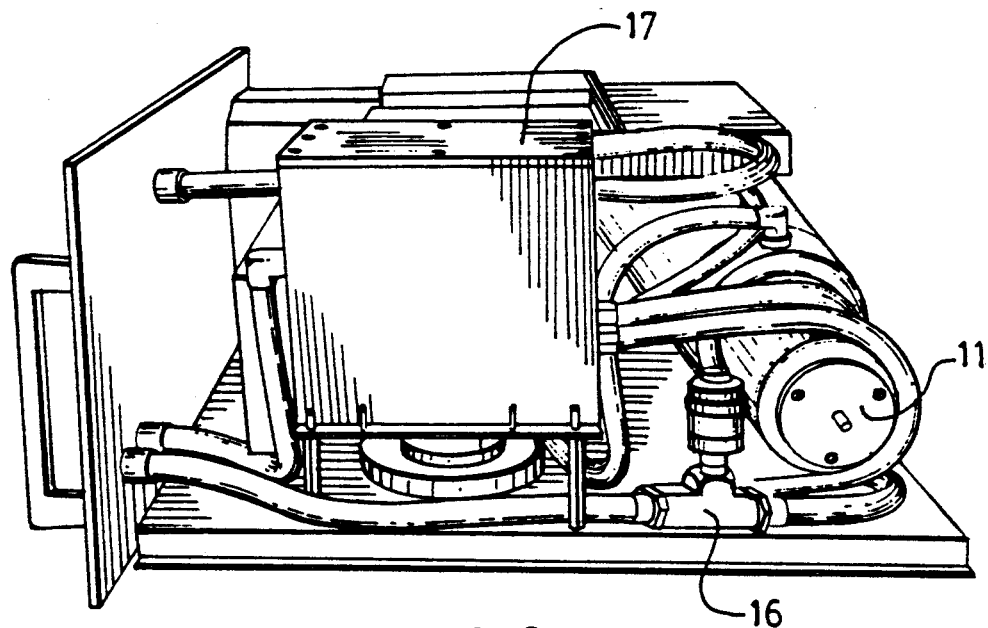
FIGS. 2a and 2b are a side view and rear view, respectively, of a successful prototype of the pump.
Figure 2B:
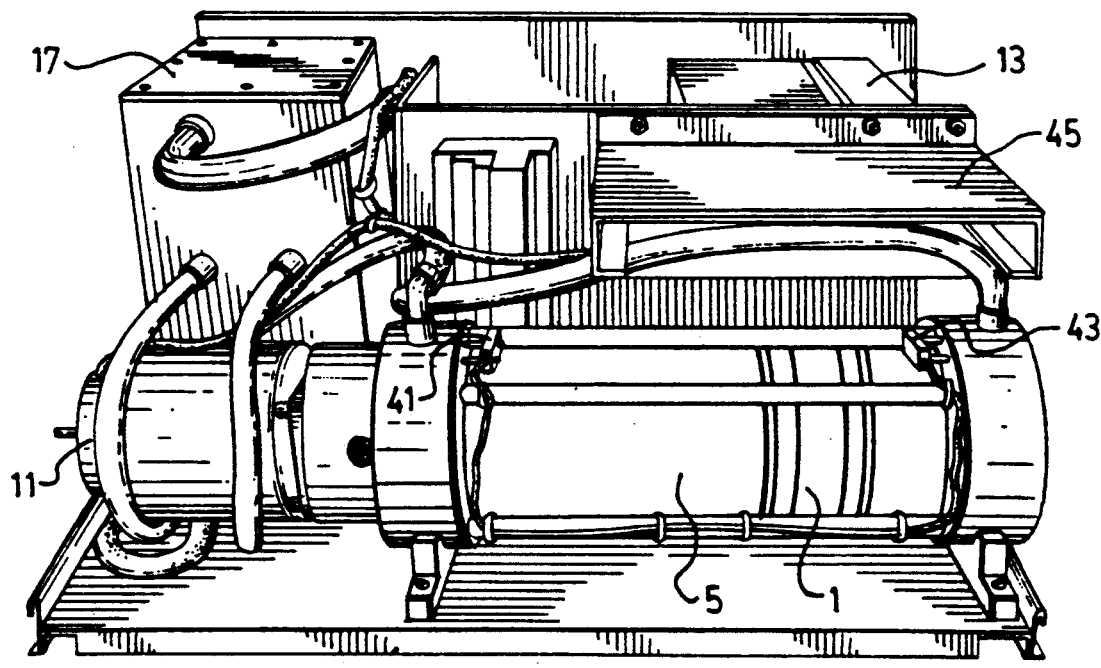

The successful prototype of the pump according to the present invention is shown with reference to FIGS. 2a and 2b. The prototype device consists of the pump assembly (including valve 16 and motor 11), motor controller 13 and reservoir 17 in a 25×50×50 cm³ metal enclosure. The side view of FIG. 2a shows the reservoir 17, magnetic stirrer 19, valve 16 and motor control hardware. The stirrer 19 is preferably coated with Teflon TM and is located over a rotatable magnet which cause the stirrer to continuously rotate and thereby mix the fluid. In the rear-view of FIG. 2b, the pump-motor assembly is shown with a motor driver 45 located above.

Figure 3:
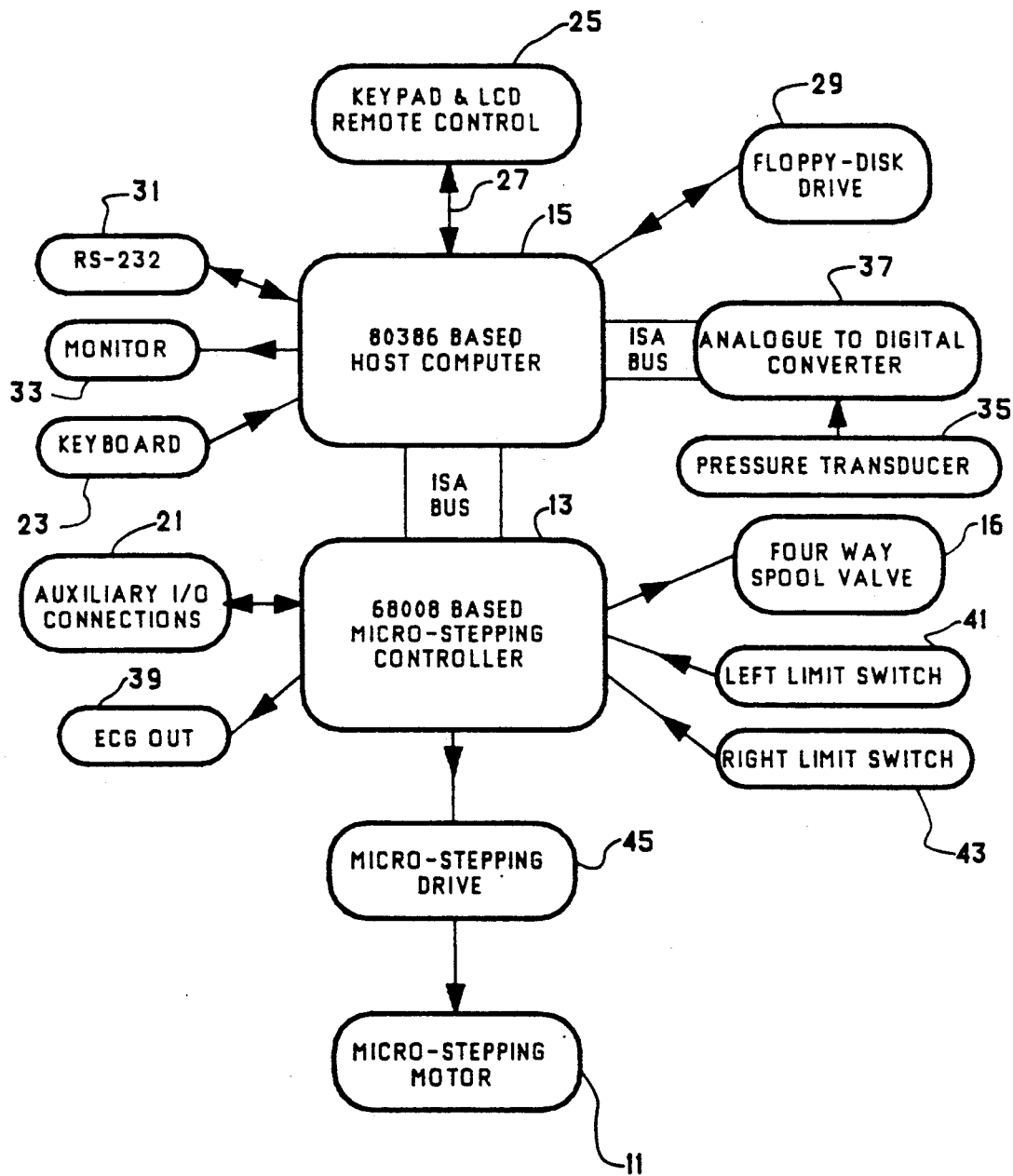
FIG. 3 is a block diagram of the host computer and micro-stepping controller according to the preferred embodiment.

Turning to FIG. 3, a hardware block diagram is shown illustrating greater details of the microstepping motor controller 13 and computer 15. As discussed above, the pump is controlled by an embedded 80286-based host computer 15. The host computer communicates with motor controller (model PC-23, Compumotor, Corporation, Cupertino, Calif.) which is provided with an on-based 68008 microprocessor. The controller 13 also produces the required control signals for the spool valve 16 and generates TTL logic pulses via auxiliary I/O connections 21, allowing gated data acquisition.

The user defined waveform data can be entered into the host computer 15 in any one of a number of ways. For example, the data may be entered directly into the host computer 15 via a keyboard 23. The data consists of a number of discrete flow points in units of millilitres per second, which represent the desired flow waveform. Up to 400 points can be entered to describe one flow waveform. The time interval is entered by the user as well, and is in the range of 2 milliseconds to 50 milliseconds.

Alternatively, the waveform data can be entered directly into the host computer 15 via a hand held LCD remote control 25. In this case, the data containing the information described above, is entered by the user on a keypad, which communicates with the host computer 25 via a serial line 27.

According to the successful prototype, the keypad and LCD remote control 25 was a QTERM-II remote keypad with liquid crystal display.

Alternatively, the data may be transferred from a external computer via magnetic media. In this case, an ASCII data file containing the information described above, is written to a floppy disk by an external computer. This disk is then read by the host computer 15 via its floppy disk drive 29.

As a further alternative, the waveform data may be transferred over an RS-232 serial communications line 31 from an external device. ASCII data, containing the information described above, is accepted by the host computer 15 from the RS-232 serial link in a well known manner.

Finally, the user waveform data may be input directly into the host computer 15 in an analogue form via a graphics tablet or pointing device, such as a mouse (not shown). In this case, the waveform shape is entered by the user, and a discrete representation of the waveform is obtained by the host computer 15 using well known and readily available software. The user may enter the desired flow rate and time-interval data, and the host computer 15 calculates the correct shape in millilitres per second.

In addition to the peripherals discussed above, the host computer 15 also incorporates a video monitor 33 in a well known manner. Furthermore, a pressure transducer 35 may be connected to an analogue-to-digital converter 37 which may be connected to the host computer 15 via an ISA bus for feedback control of the pump, as discussed in greater detail below.

The host computer 15 and micro-stepping controller 13 illustrated in FIG. 2 fulfil different tasks in the process of controlling the pump. The host computer 15 provides an interface to the user. It controls the input and output devices such as the keyboard 23, monitor 33, remote control 25, floppy disk drive 29 and RS-232 serial port 31. In addition, the host computer 15 converts the flow data from an ASCII format data file in millilitres per second format into commands that the micro-stepping controller 13 is capable of executing. The host computer 15 may also be used to operate additional devices such as the analogue to digital converter 37 for acquiring pressure information, as discussed in greater detail below.

On the other hand, the micro-stepping controller 13 controls the rotation speed of the stepper motor 11, and sets the state of the spool valve 16, ECG output 39 and auxiliary I/O connections 21. The controller 13 also monitors the state of a left limit switch 41 and right limit switch 43 disposed at opposite ends of the cylinder 5, as discussed in greater below. All of the commands executed by the micro-stepping controller 13 originate from the host computer 15. The net result is that the user enters a fluid flow waveform via the keyboard 23, or other interface, and the pump produces the appropriate fluid flow to generate the requested waveform. In this regard, a micro-stepping drive circuit 45 circuit converts digital command signals from the controller 13 for controlling operation of the motor 11. According to the successful prototype, the drive 45 is a Compumotor model DB micro-stepping motor drive.

Figure 4A:
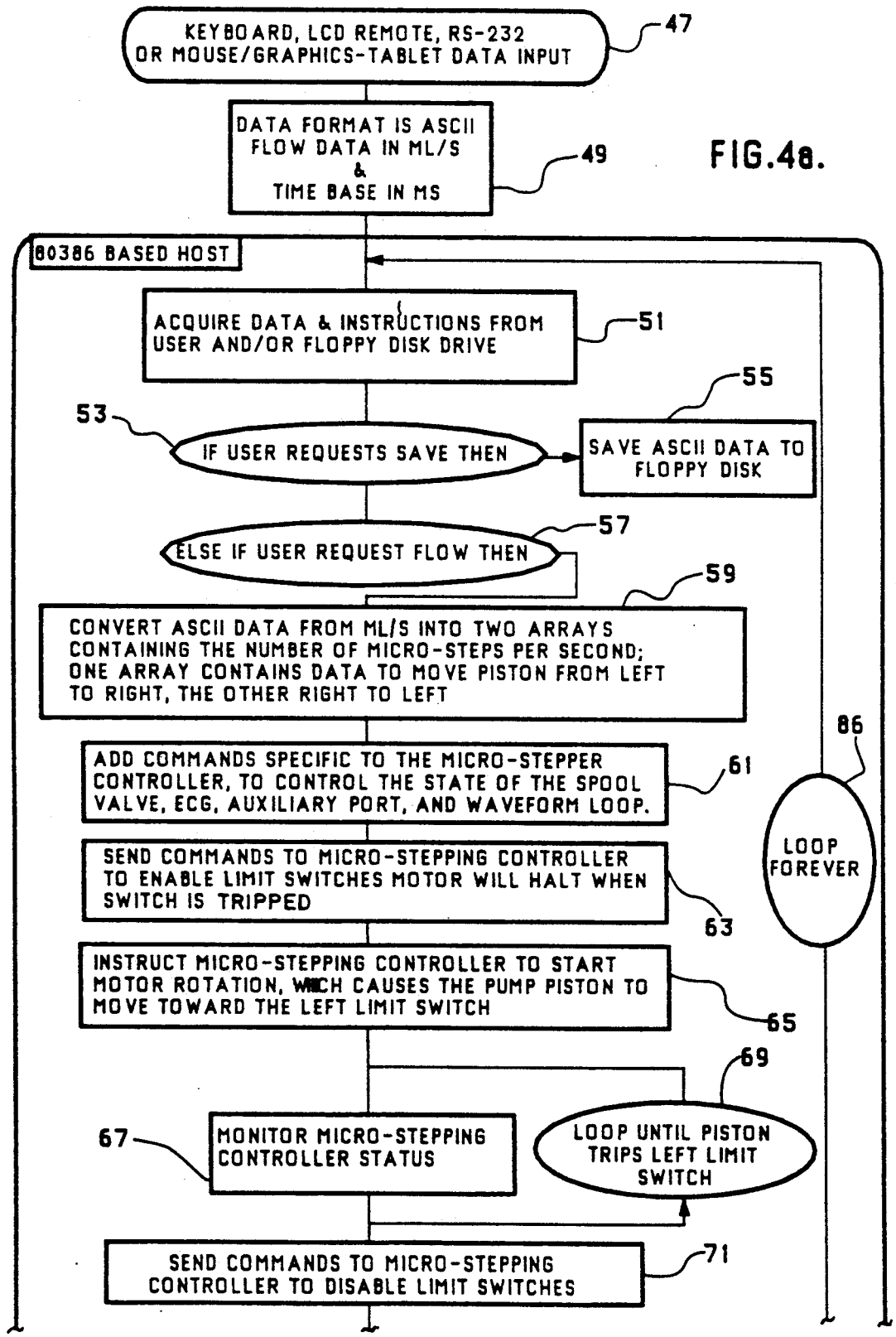
FIGS. 4a and 4b together as shown in 4c, comprise a flow chart illustrating operation of the host computer according to the preferred embodiment.
Figure 4B:
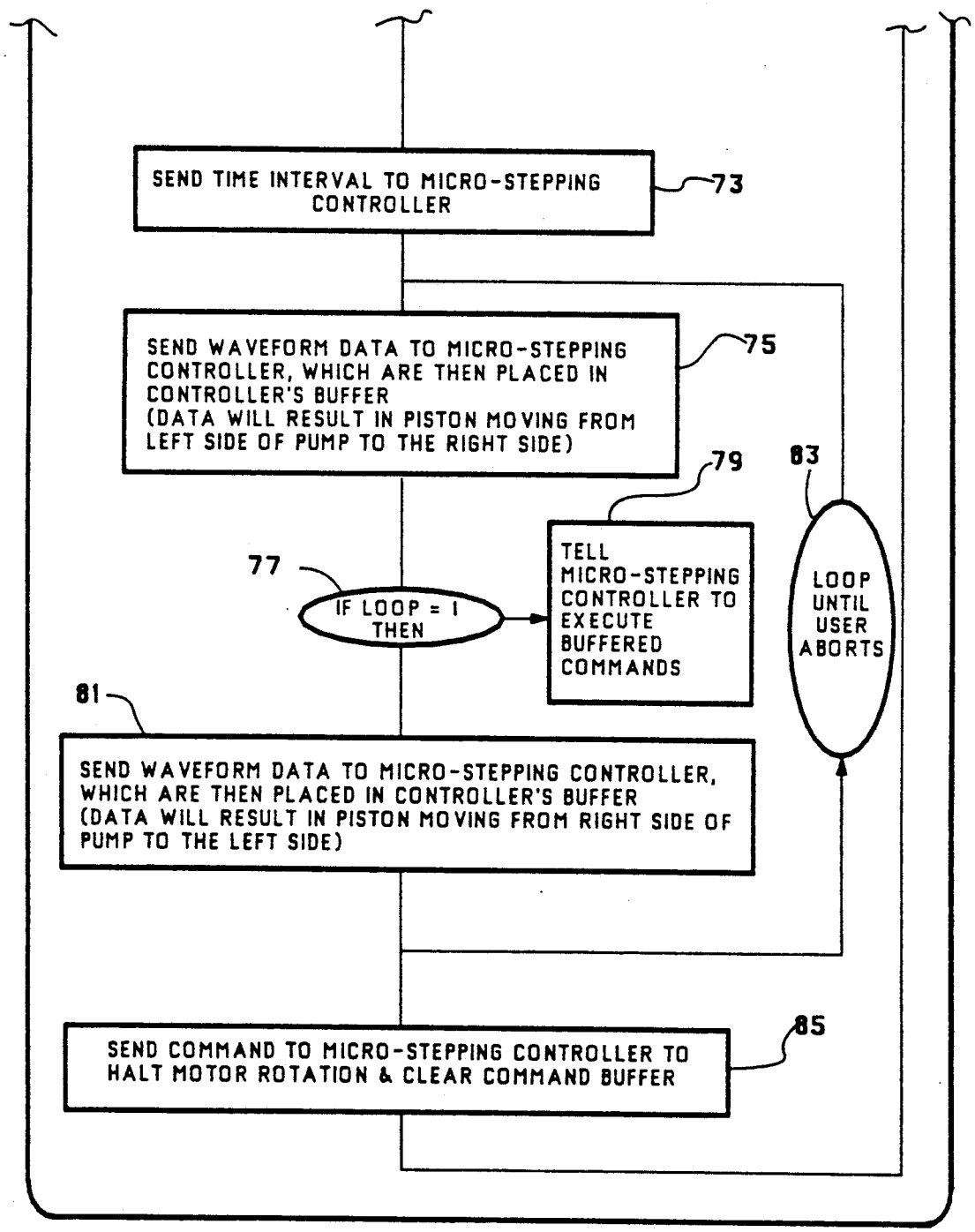

The flow of data and commands through the host computer 15 is shown with reference to the flow charts of FIGS. 4a and 4b in combination as shown in FIG. 4c. The main task performed by the host computer 15 is the acquisition of data and commands from the user, and the conversion of this data and the commands into a form which is executable by the micro-stepping controller 13.

Figure 5A:
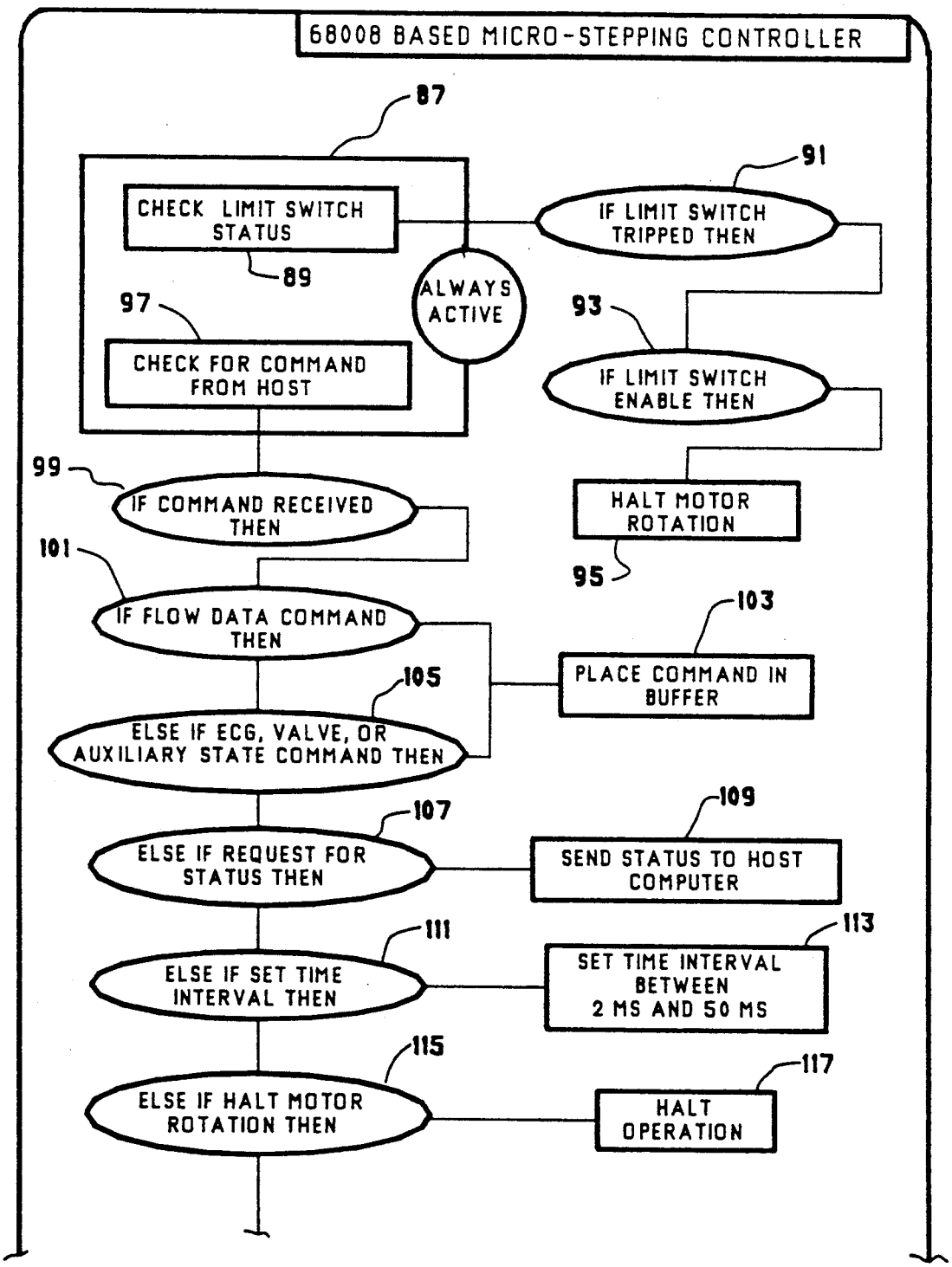
FIGS. 5a and 5b together as shown in FIG. 5c comprise a flow chart illustrating operation of a micro-stepping controller according to the preferred embodiment.
Figure 5B:
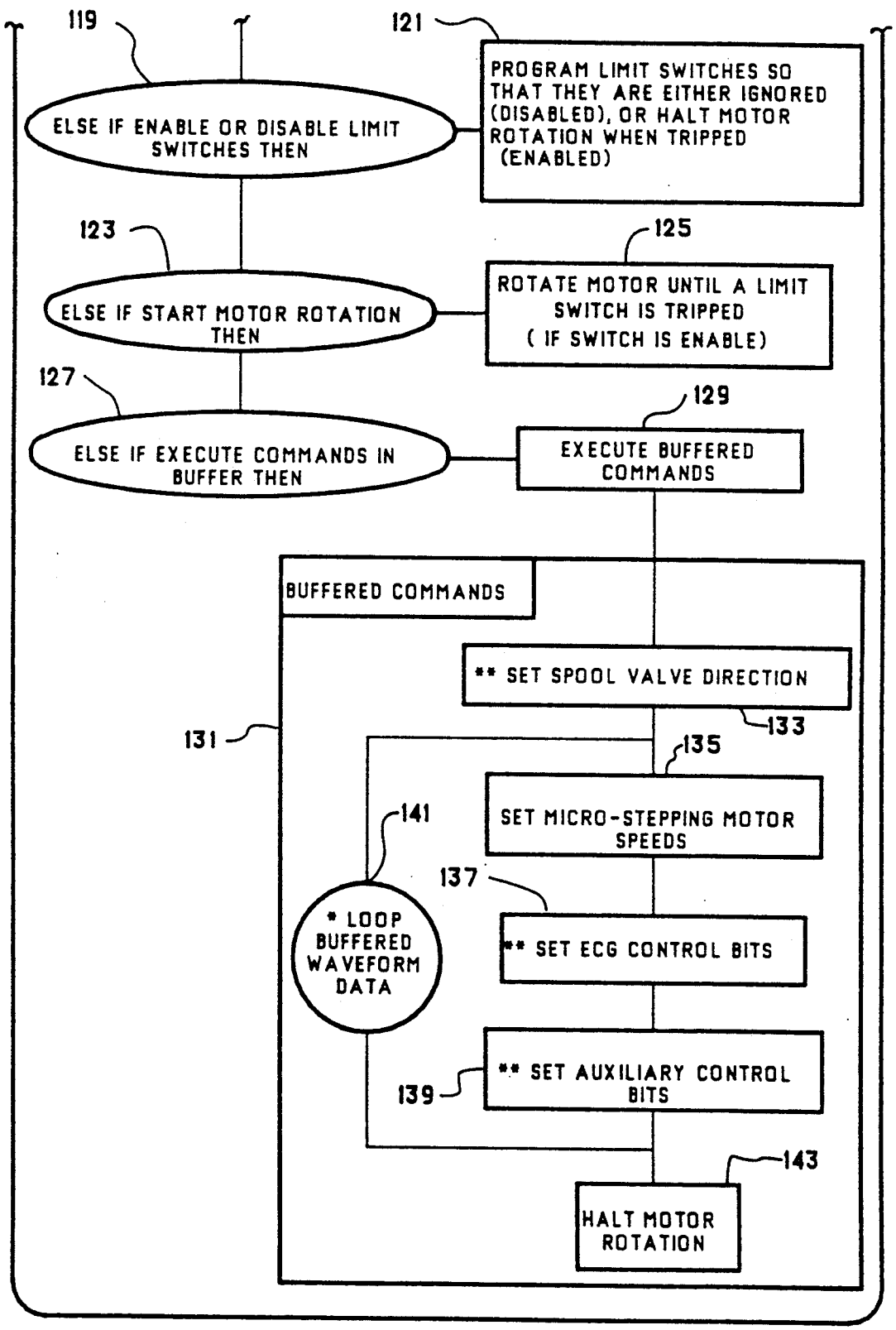

FIGS. 5a and 5b when combined as shown with reference to FIG. 5c, illustrate the flow of data and commands through the micro-stepping controller 13. The controller 13 receives all commands from the host computer 15. Commands can be executed in two ways, either immediately or buffered. Motor speed, valve state, ECG state and auxiliary status commands are usually buffered, while commands for halting operation and setting the time interval are executed immediately.

Turning to the flowchart in FIGS. 4a and 4b, a user defined flow waveform is first input into the system via keyboard 23, LCD remote control 25, RS-232 port 31, or a mouse/graphics tablet (step 47). The data is configured as an ASCII text file and contains the required flow information and configuration parameters in terms of flow data in milliliters per second and the time base in milliseconds (step 49).

The software running in host computer 15 then initiates acquisition of the data and instructions from the user and/or floppy disk drive (step 51). If the user has requested that the received data should be saved, then the data is saved as an ASCII text file to a floppy disk in disk drive 29 (steps 53 and 55).

Otherwise, if the user has requested initiation of the pump to generate a user defined flow waveform, then the ASCII data is converted from milliliters per second to two arrays containing the number of microsteps per second of rotation of the motor 11 (steps 57 and 59). The first array contains data to move the piston 1 from left to right within the cylinder 5, and the second array contains data for moving the piston from right to left.

In step 61, commands are created by the host computer 15 which are specific to the micro-stepping controller 13, in order to control the state of the spool valve 16, ECG output 39, auxiliary port 21 and the number of repetitions of the waveform (i.e. waveform loop).

Further commands are then sent to the micro-stepping controller 13 in order to enable the limit switches 41 and 43 (step 63). As discussed above, the motor 11 immediately halts when the limit switches are enabled and either one of the switches 41 and 43 are tripped.

Next, the host computer 15 instructs the micro-stepping controller 13 to start rotation of the motor 11, thereby causing the pump piston to move within the cylinder 5 towards the left limit switch 41 (step 65). The host computer 15 then monitors the status of the micro-controller 13 (step 67) until the controller 13 detects that the left limit switch 41 has been tripped (step 69). This procedure is required for initialization of the system.

According to step 71, commands are generated by the host computer 15 to the micro-stepping controller 13 in order to disable the limit switches 41 and 43.

Next, the user defined time interval (i.e. from 2 milliseconds to 50 milliseconds) is transmitted to the micro-stepping controller 13 (step 73).

The waveform data is then transmitted to the micro-stepping controller from host computer 15 and placed in a data buffer of controller 13 (step 75). This data corresponds to the first array referred to above with reference to step 59, and results in the piston 1 moving from the left side of the cylinder 5 to the right side thereof.

If the host computer 15 determines that this is the first loop of the waveform (step 77), then a command is generated to the controller 13 for initiating execution of the buffered commands stored therein (discussed in greater detail below with reference to FIG. 5b).

At this stage, the controller 13 executes the required commands for moving the piston 1 from the left side of the cylinder 5 to the right side thereof in accordance with the user defined flow waveform. Once the piston 1 is at the end of its stroke from left to right within the cylinder 5, then the host computer 15 sends further waveform data to the micro-stepping controller 13, which is again placed in the data buffer of controller 13 (step 81). This further data corresponds to the second array discussed above with reference to step 59, and results in the piston moving from the right side of the cylinder 5 to the left side thereof.

The cycle of steps 75, 77 and 81 is repeated indefinitely until the user issues a command to abort the process (step 83).

Upon receipt of such a halt or abort command, the host computer 15 sends a command to the micro-stepping controller 13 to halt motor rotation and to clear the command buffer (step 85).

The overall software running in the host computer is interrupt driven and continues indefinitely (i.e. until power shut-off) (step 86).

Turning to FIG. 5a, the software process within micro-stepping controller 13 is shown in greater detail. As with the software running in host computer 15, the controlled software is also interrupt driven. Therefore, the software continuously activates the block shown as 87 until receipt of an interrupt (i.e. step 89 or 97). The first function performed by block 87 is to check the status of the limit switches 41 and 43 (step 89). If one of the limit switches has been tripped (step 91), and if the limit switches are enabled (step 93), then motor rotation is halted (step 95).

The second function executed in block 87 is to check for commands from the host computer 15 (step 97). If a command is received (step 99), and if the command is in the form of a flow data command (step 101), then the command is placed in the data buffer for controller 13 (step 103).

Otherwise, if the host command relates to one of either ECG, valve 16, or auxiliary state (step 105), then this command is also placed in the command buffer (step 103).

In the event that the host command is a request for status (step 107), then the controller 13 generates and transmits a status signal to the host computer 15 (step 109).

If the command from the host computer 15 relates to setting the time interval (see step 73), then the time interval is set in controller 13 between 2 milliseconds and 50 milliseconds (steps 111 and 113).

If the command from the host computer relates to halting motor rotation (see step 85), then the controller 13 halts rotation of the motor 11 (steps 115 and 117).

If the command from the host relates to enabling or disabling the limit switches 41 and 43 (step 119), then the limit switches are programmed via controller 13 so that they are either ignored by the software (i.e. disabled), or will result in halting motor rotation when tripped (i.e. enabled), (step 121).

If the host command relates to starting motor rotation (see step 65), then the controller 13 initiates rotation of the motor 11 until the limit switch 41 is tripped (assuming that the switch is enabled), (steps 123 and 125).

Otherwise, as shown in steps 127 and 129, if the host command relates to executing commands stored in the data buffer (see step 79), then the buffered commands shown in block 131 are executed.

Specifically, within the buffered command block 131, the controller 13 sets the direction of spool valve 16 for configuring one of the lines from the valve 16 to the cylinder 5 as an inlet and the other one of the lines from the valve 16 to the opposite end of cylinder 5 as an outlet (step 133).

Next, the speed of the stepper motor 11 is set (step 135), the ECG control bits are set (step 137), and the auxiliary control bits are set (step 139).

Then, the user input flow waveform is executed in accordance with the data contained in one of either the first array or the second array for a predetermined number of times (step 141) until the piston 1 reaches the end of its stroke within the cylinder 5. The number of loops or repetitions required is calculated in advance by the host computer 15. Once the waveform data has been executed for moving the piston from one side of the cylinder 5 to the other, motor rotation is halted (step 143).

This process is repeated upon receipt of the next host command (e.g. step 75 or 81) to execute the array data pertaining to the next cycle of the fluid flow waveform.

The pump of the present invention is compatible with a wide of variety of blood-mimicking fluids for research and calibration applications. According to the preferred embodiment, an oil emulsion (e.g. Syn-cut GP TM semi-synthetic cutting fluid for machining, produced by Aera Tech, Mississauga, Ontario) is provided which contains micro-crystalline cellulose scatterers having an average diameter of 20 $\mu$m. The speed of sound and viscosity of this fluid can be controlled by dilution with water. A preferred dilution of the solution results in a speed of sound of 1550 meters per second and a kinematic viscosity of 0.03 stokes (at 22° C.).

According to an alternative embodiment, a mixture of glycerol and water may be used as the working fluid.

In appropriate proportions (four part glycerol to five parts water), the viscosity of this mixture approximates that of blood (see W. N. McDicken (1986): A Versatile Test Object for the Calibration of Ultrasonic Doppler Flow Instruments, *Ultrasound in Medicine and Biology*, 26, pages 245-249). The salinity of the fluid is adjusted to normal physiological levels (0.9% by weight) to ensure proper functioning of the electromagnetic flow meter. To provide an adequate sound signal, microcrystalline cellulose particles are added (5 grams per litre) with an average diameter of 20 μm. In the successful embodiment, these particles are Type 20 Sigmacell TM, produced by Sigma Chemical Company, St. Louis, Mo.

Operation of the successful prototype of the invention has been verified for the production of both steady-flow rates and pulsatile waveforms.

Figure 6A:
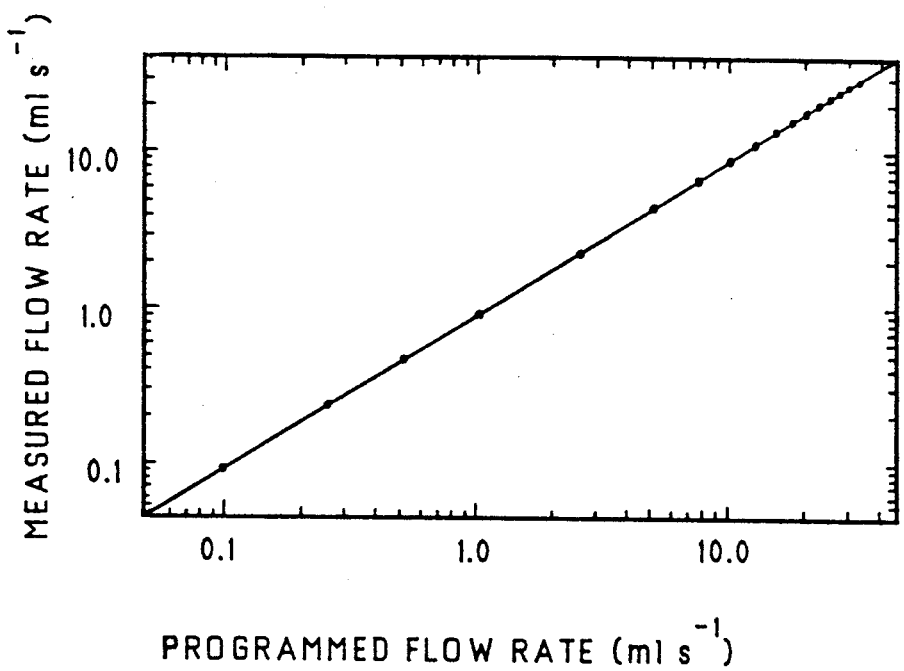
FIGS. 6a and 6b are graphs showing measured flow rate versus programmed flow rate, and residual error versus programmed flow rate, respectively.
Figure 6B:
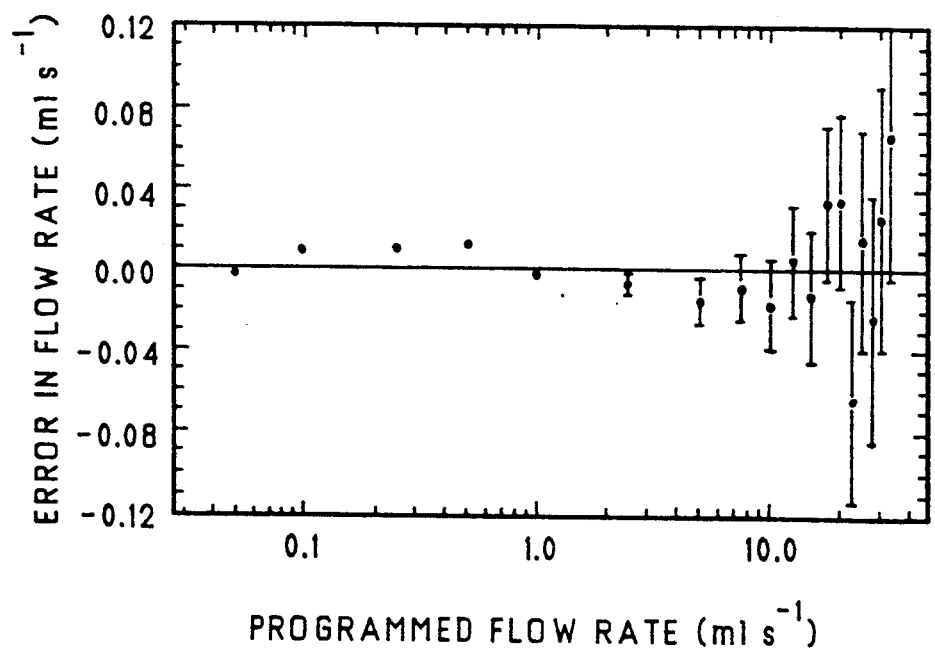

In FIGS. 6a and 6b, the measured output flow rate is shown versus the programmed flow rate, over the range of 0.05 to 30 millilitres per second. The observed flow rate is within ±0.08 millilitres per second over the entire operating range. In particular, with reference to FIG. 6a, the measured flow rate is shown versus the programmed flow rate, with the line of best fit. In FIG. 6b, the residual error is plotted after subtraction of the best fit from FIG. 6a.

The computer controlled pump of the present invention has also been tested with clinical Doppler ultrasound equipment to verify compatibility. In FIGS. 7 and 8, measured data is shown for simulated carotid and femoral waveforms, compared to physiological in vivo measurements, showing close similarities between the simulated and measured physiological waveforms in both cases.

Figure 7A:
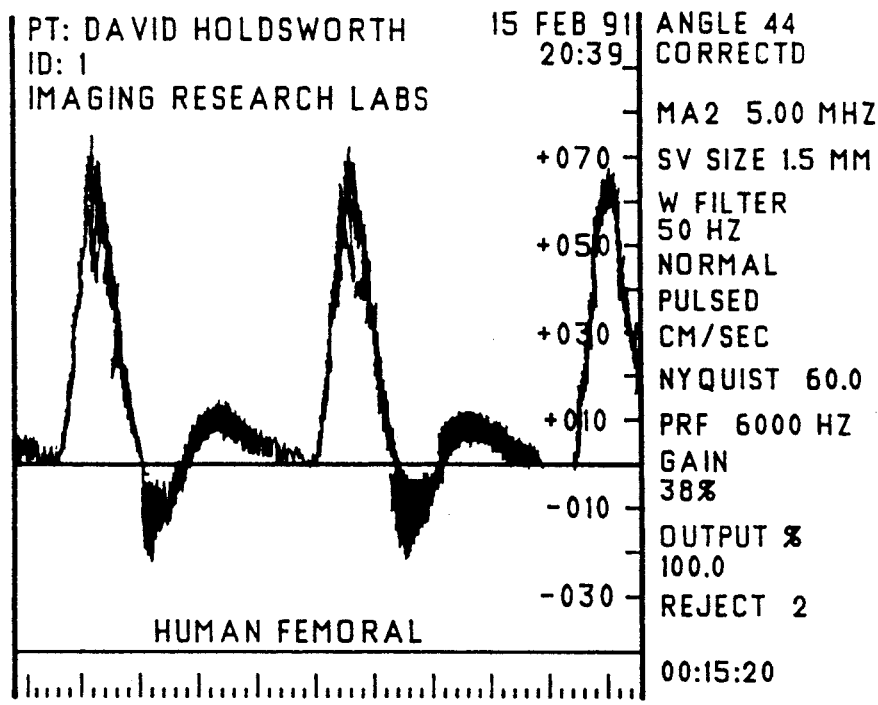
FIG. 7a shows the measured blood flow waveform in the human femoral and FIG. 7b shows a simulated blood flow waveform produced by the pump according to the preferred embodiment.
Figure 7B:
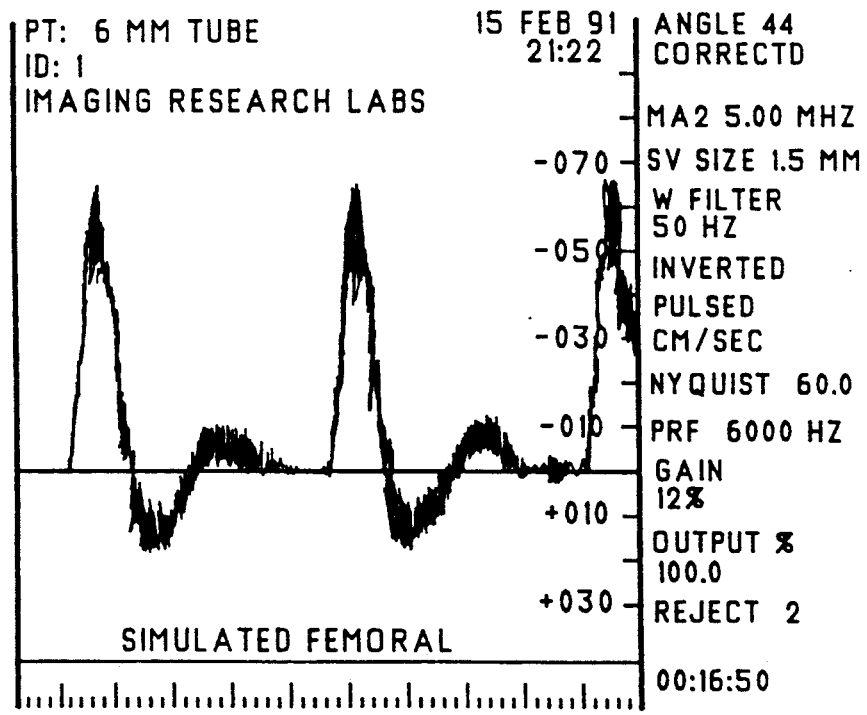
Figures 8A, 8B:
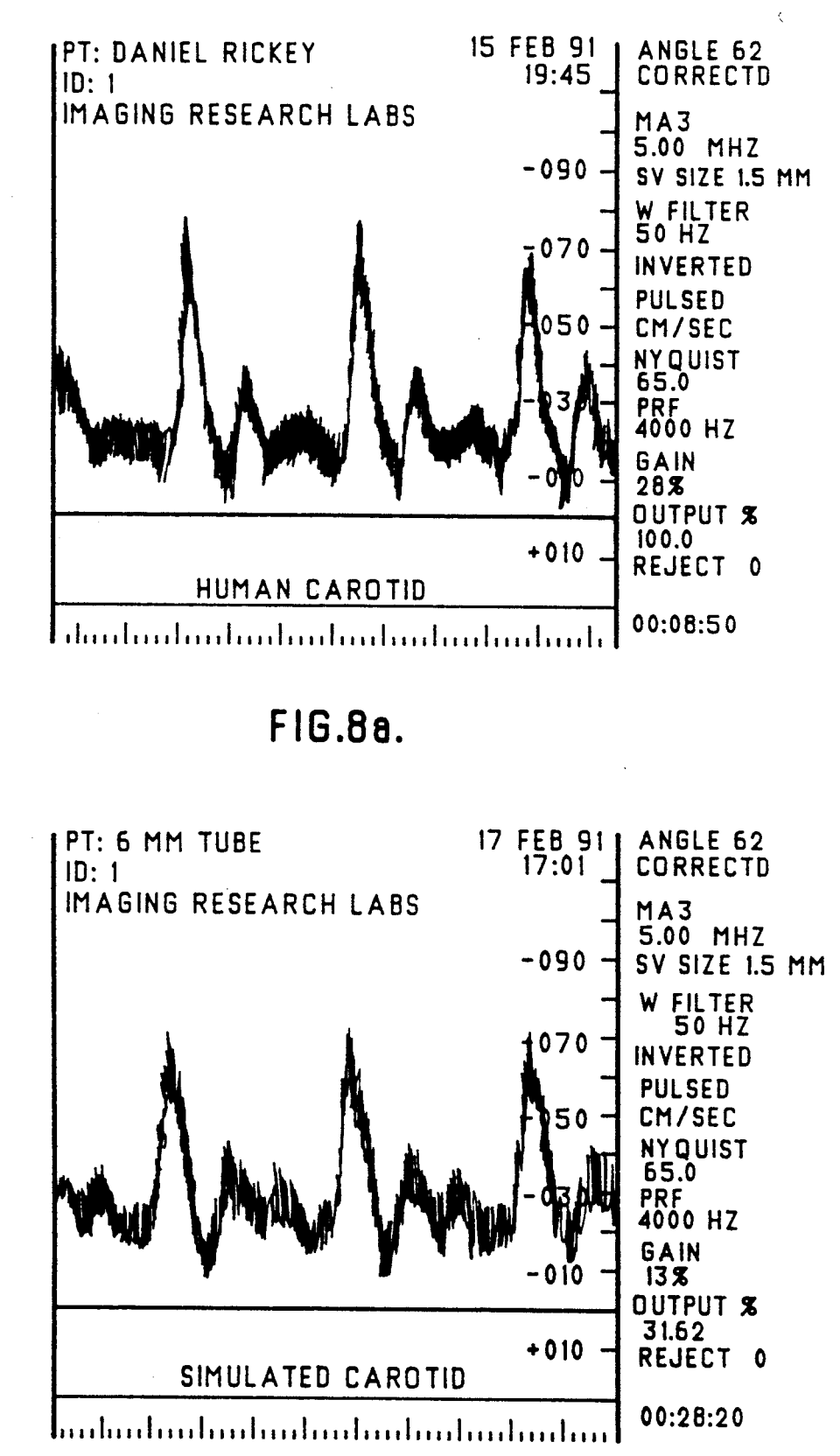

In particular, with reference to FIG. 7a, a blood flow waveform of the human femoral is shown while in FIG. 7b, the simulated femoral flow waveform is shown as generated by the pump of the present invention. Likewise, in FIG. 8a, an actual blood flow waveform is shown from the human carotid artery, while in FIG. 8b, the simulated carotid waveform is illustrated.

In summary, according to the present invention, a pump is provided for producing both pulsatile and steady flow waveforms. The pump of the present invention has advantages over previous designs, such as a nearly 100% duty cycle for steady flow by virtue of the dual inlet/outlet aspect of the cylinder 5 along with the control valve 16. When the pump is programmed to reproduce a steady volume flow rate typical of the peripheral vasculature, the time between valve switches is 12 seconds which is long in comparison to the observed duration of the flow disruption. The 0.4 seconds of flow disturbance detected in pulsatile waveforms is less disruptive, because switching of the valve 16 and associated reversal of piston 1 can occur at a point of little or zero flow. Furthermore, the TTL output signals from I/O connection 21 may be used to exclude flow disruption anomalies from data collection.

There is no requirement for continuous feedback with the pump according to the present invention, since the open-loop performance has been observed to be extremely stable for long periods of time. The basic design of the pump according to the invention may also be easily modified to accommodate larger or smaller flow rates because maximum flow rate depends only on the piston diameter and available motor torque.

The pump of the present invention is ideal for the absolute calibration of clinical Doppler ultrasound instruments, and results in an absolute flow source, thereby eliminating the need for additional instrumentation to measure the true flow rate.

Figure 9:
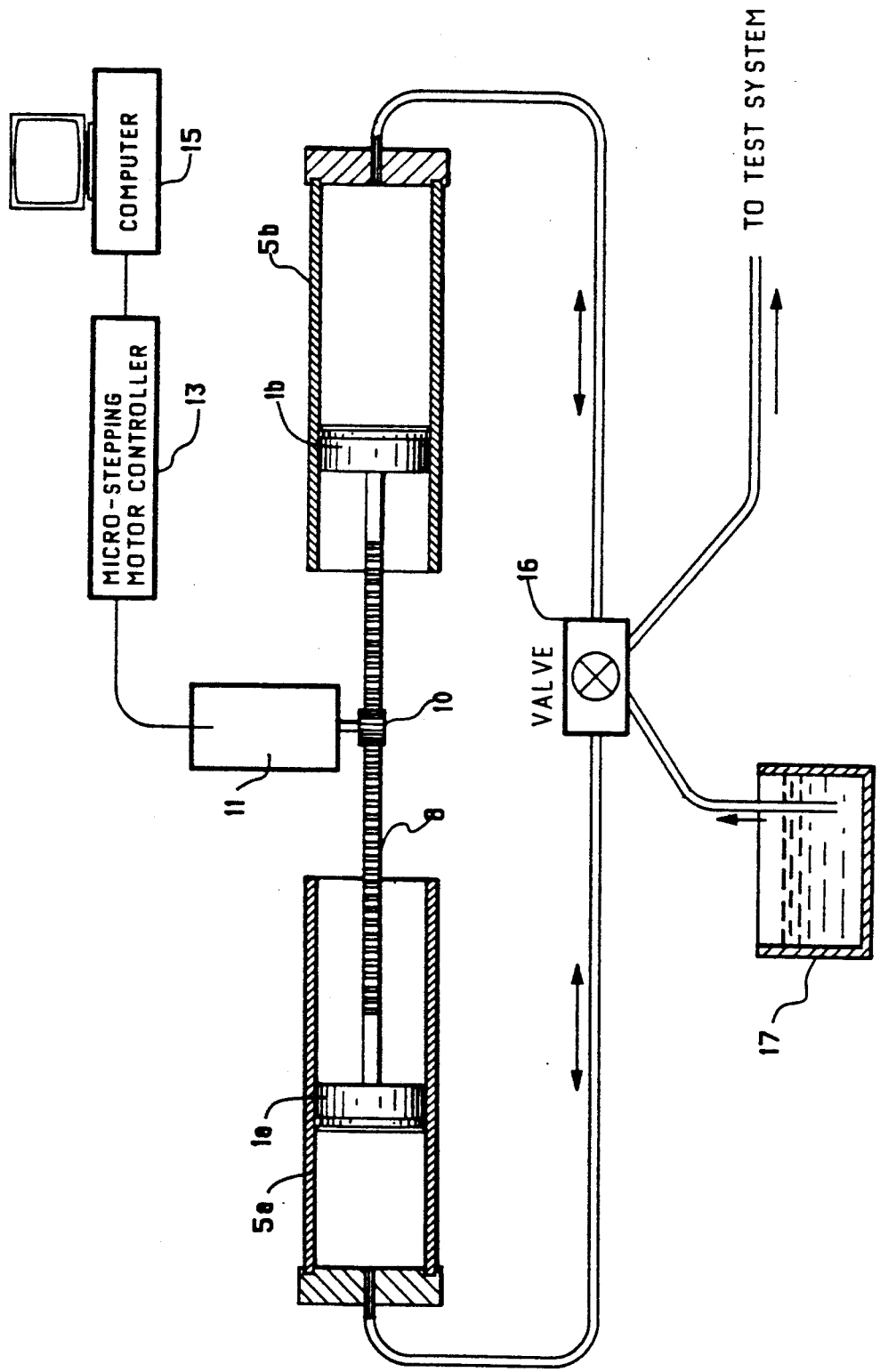
FIG. 9 is a schematic diagram of a positive displacement pump according to an alternative embodiment of the invention.

Other embodiments and variations of the invention are possible. For example, with reference to FIG. 9, an alternative embodiment is shown wherein a single piston 1 and cylinder 5 are replaced by two rack-mounted pistons 1a and 1b driven in horizontally opposed lucite cylinders 5a and 5b by the computer controlled stepper motor 11. The gearing between the motor 11 and pistons 1a and 1b is in the form of a rack 8 and pinion 10. The tooth displacement for the rack and pinion arrangement is such that one motor microstep results in the displacement of 0.510 μl from the pump cylinders 5a and 5b. In the design of FIG. 9, each cylinder 5a and 5b has a usable stroke volume of 180 millilitres, although larger or smaller volumes are possible with minimal change. In all other respects, the alternative embodiment of FIG. 9 operates in a similar manner as discussed above with reference to the preferred embodiment of FIG. 1.

Other alternatives and variations are contemplated. For example the range of flow rates supplied by the pump may be easily varied, with only minor changes to the design of the preferred embodiment. The diameter of piston 1, the pitch of lead screw 3 and the size of the drive motor 11 can be configured so as to produce very small flow rates (e.g. 0.001 millilitres per second to 0.1 millilitres per second) for use in experimental studies of the micro-vasculature. Alternatively, larger components can be used to produce much higher flow rates (e.g. 10 millilitres per second to 200 millilitres per second), which are typical of peak aortic blood flow.

The acrylic pump drive cylinder 5 can also be made from other suitable materials, such as glass or stainless steel, in applications which require high pressures or exposure to solvents, ketones or weak acids. In addition, the pump cylinder 5 and reservoir 17 can be maintained at constant temperature by resistive heating elements in applications which require dispensation of heated fluids.

The addition of an analogue-to-digital converter 37 allows the pump output to be controlled by feedback from the external pressure transducer 35. In this way, the pump can be operated as a computer-controlled pressure source, for providing either constant pressure or pulsatile pressure waveforms. In operation, once the controller 13 has received commands from the host computer 15, the controller 13 executes without further intervention from the host computer 15 for periods ranging from several seconds to minutes. During this time, the host computer 15 is free to digitize pressure data received from the transducer 35 and store this data in a main memory of the computer 15 or save it to disk (i.e. via floppy disk drive 29). This data can then be used to make corrections to the commands which are sent to the controller 13, so that the resulting flow waveform may be modified during operation.

The high-level computer control and versatile architecture of the pump according to the present invention yields many applications of the pump in a variety of areas outside of the primary application of blood-flow simulation. A number of these applications are described below.

Human organs require blood transfusion during transportation between hospitals. At present, this is accomplished with steady flow, but there are indications that blood pulsatility may play a role in tissue perfusion, (see Tranmer, B. I., Gross, C. E., Kindt, G. W., Adey, G. R, (1986): Pulsatile Versus Nonpulsatile Blood Flow in the Treatment of Acute Cerebral Ischemia, *Neurosurgery*, 19, 724-731). Accordingly, the pump of the present invention may be used to transfuse blood and thus extend the time over which an organ may remain viable. The computer-controlled pump of the present invention can be used to perfuse excised organs, such as the heart and kidneys, with blood waveforms very similar to those found in vivo. The size of the device can be reduced for ease of transportation and the device can be adapted to operate under battery power.

The development of artificial heart valve prosthetic devices requires the controlled testing of new designs. This testing is presently done on pressure and flow simulators, sometimes at accelerated rates. The computer-controlled pump of the present invention is capable of performing these functions, producing a range of blood flow waveforms similar to those found in the human aorta. The modifications necessary to increase the peak flow rate for testing artificial heart valve prosthetic devices is described above.

The ability of the pump according to the present invention to produce physiologically correct blood flow waveforms, with little damage to suspended particles, results in a further possible use as a ventricular device. External pumps are known for reducing the load on a failing heart while the patient awaits surgery. The pump of the present invention is capable of responding to changes in heart rate or blood pressure, when connected to the appropriate pressure transducer (35). The materials used in the construction of such a heart assist external pump must be blood-compatible, and allow the device to be sterilized. All such modifications can be easily effected in the pump of the present invention.

Some industrial processes, particularly in the chemical industry, require controlled injection of small amounts of catalysts during production. Fluids can be injected at high pressure and high temperature, and with high accuracy using the computer-controlled pump of the present invention. The cylinder and motor design may be modified to suit the particular application, but the basic design and software control would remain the same. Several dispensing stations can be controlled with a single pump according to the present invention, since each motor controller 13 is capable of controlling three drive motors.

The high accuracy of the present device (flow rates of ±0.08 milliliters per second) and volumes of ±0.001 milliliters) makes it ideal for precise dispensation of fluids during packaging. This is especially true in industry where the material cost is high (i.e. the pharmaceutical industry). In these applications, computer controlled dispensation of exact amounts of fluid can result in significant cost savings over present techniques.

The computer controlled pump of the present invention, with an hydraulic cylinder connected to the output of the valve 16, can function as a precision motion controller. The high precision in fluid dispensation translates into high precision of motion control. Small cylinders can be used to provide motion control in confined spaces or harsh environments. Again, the basic computer control software remains unchanged, and up to three hydraulic cylinders can be controlled by the controller 13 as described herein.

Other modifications and variations of the invention are possible without departing from the sphere and scope of the claims appended hereto.

What is claimed is:

1. A positive displacement pump, comprising:
   a) a reservoir for storing fluid;
   b) cylinder means comprising a single tube for receiving and discharging fluid from opposite ends thereof;
   c) piston means within said cylinder means for forcing said fluid into and out of said opposite ends of said cylinder means;
   d) a four-way valve having an inlet port connected to said reservoir, a pair of bidirectional ports connected to said opposite ends of said cylinder means, and an outlet port; and
   e) means for receiving a user flow waveform expressed in terms of a predetermined flow rate as a function of time and in response moving said piston and configuring said four-way valve to provide fluid flow from said reservoir through said valve into one of said opposite ends of said cylinder means, and from the other one of said opposite ends of said cylinder means through said valve to said outlet port in accordance with said user flow waveform.

2. The positive displacement pump of claim 1 wherein said reservoir further includes a magnetic stirrer for mixing said fluid.

3. The positive displacement pump of claim 1 further including one of either a hand-held keypad, a computer keyboard or a digital data interface connected to said means for receiving, for inputting said user flow waveform.

4. The positive displacement pump of claim 1 wherein said cylinder means comprises a pair of horizontally opposed lucite tubes, one end of each of said tubes being connected to a respective one of said bidirectional ports.

5. The positive displacement pump of claim 4 wherein said gear is a rack and pinion gear in which the pinion is connected to said stepper motor intermediate said pair of tubes.

6. The positive displacement pump of claim 5 wherein said piston means comprises a pair of circular disks connected to opposite ends of said rack and being disposed in respective ones of said pair of tubes.

7. The positive displacement pump of claim 1 wherein said cylinder means comprises an acrylic tube connected at opposite ends thereof to respective ones of said bidirectional ports, and an off-axis shaft extending between said opposite ends.

8. The positive displacement pump of claim 7 wherein said tube is characterized by a useable stroke volume of approximately 450 ml.

9. The positive displacement pump of claim 7 wherein said gear is a lead screw connected to said stepper motor and extending between said opposite ends of said cylinder means.

10. The positive displacement pump of claim 9 wherein said piston means comprises a circular disk having a central threaded aperture through which said lead screw passes, and further off-axis aperture through which said off-axis shaft extends for preventing rotation of said piston means within said cylinder means.

11. The positive displacement pump of claim 9 wherein said lead screw is characterized by a predetermined pitch such that one micro-step of rotation of said stepper motor results in 0.198 $\mu$l of fluid displacement.

12. A positive displacement pump of claim 1 wherein said means for receiving further comprises:

i) a stepper motor connected to said piston means via a gear for translating rotational motion of said stepper motor into linear driving motion of said piston means; and ii) control means for configuring said four-way valve and for digitizing and interpolating said user flow waveform to a predetermined temporal interval and in response generating and transmitting control signals to said stepper motor for rotating said stepper motor at predetermined speeds, thereby moving said piston means within said cylinder means to discharge said fluid at said predetermined flow rate as a function of time.

13. The positive displacement pump of claim 12 further including a pair of limit switches connected to said control means and located in said cylinder means at said opposite ends thereof for detecting motion of said piston means to said opposite ends of said cylinder means and in response generating a signal to said control means for immediately ceasing rotation of said stepper motor.

14. The positive displacement pump of claim 12 wherein said stepper motor produces 0.5 N-m of torque at rotational speeds of from 0 to 8 revolutions per second.

15. The positive displacement pump of claim 12 wherein said predetermined temporal interval is in the range of from 2 ms to 5 ms.

16. The positive displacement pump of claim 13 wherein said control means further comprises:

iii) a host computer for converting said predetermined flow rate into a first array of values representing micro-steps per second of clockwise rotation of said stepper motor, and a second array of values representing micro-steps per second of counter-clockwise rotation of said stopper motor; and iv) a micro-stepping controller connected to said host computer, said four-way valve, and said stepper motor, for receiving said first array of values and in response generating and transmitting a first valve direction signal to configure said four-way valve for fluid flow in one direction through said cylinder means and generating and transmitting a first one of said control signals to said stepper motor for clockwise rotation of said stepper motor, and for receiving said second array of values and in response generating and transmitting a second valve direction signal to configure said four-way valve for fluid flow in an opposite direction through said cylinder means and generating and transmitting a second one of said control signals to said stepper motor for counter-clockwise rotation of said stepper motor.

17. The positive displacement pump of claim 16 further comprising a pressure transducer connected to said outlet port, and an analog-to-digital converter connected to said pressure transducer and said host computer for effecting feedback control of said pump.

18. The positive displacement pump of claim 16 wherein each rotation of said stepper motor comprises 25,000 of said micro-steps.

19. The positive displacement pump of claim 18 wherein each one of said micro-steps results in 0.198 $\mu$l displacement of said fluid.

* * * * *

UNITED STATES PATENT AND TRADEMARK OFFICE
CERTIFICATE OF CORRECTION

PATENT NO. : 5,284,423

DATED : February 8, 1994

INVENTOR(S) : David Holdsworth et al

It is certified that error appears in the above-identified patent and that said Letters Patent is hereby corrected as shown below:

Column 4, line 27, "stapper" should be -- stepper --

Column 5, line 10, "band" should be -- board --.

Column 13, line 28, "5" should be -- 50 --.

Column 13, line 29, "13" should be -- 12 --.

Column 14, line 3, "stopper" should be -- stepper --

Signed and Sealed this

Fourteenth Day of June, 1994

Attest:

BRUCE LEHMAN

Attesting Officer

Commissioner of Patents and Trademarks